US008594686B2

(12) United States Patent
Korus et al.

(10) Patent No.: US 8,594,686 B2
(45) Date of Patent: Nov. 26, 2013

(54) METHOD AND APPARATUS FOR EXTENDING A BROADCAST GROUP SERVICE (75) Inventors: Michael F. Korus, Eden Prairie, MN (US); Peter M. Drozt, Prairie Grove, IL (US); Donald G. Newberg, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 576 days.

(21) Appl. No.: 12/766,646

(22) Filed: Apr. 23, 2010

(65) Prior Publication Data
US 2011/0263288 A1 Oct. 27, 2011

(51) Int. Cl.
H04W 72/04 (2009.01)
(52) U.S. Cl.
USPC .......................................... 455/450; 455/518
(58) Field of Classification Search
USPC ............... 455/436, 518, 456.6; 370/252, 254, 370/331, 228
See application file for complete search history.

(56) References Cited

U.S. PATENT DOCUMENTS

| 7,391,724 | B2 | 6/2008 | Alakoski et al. | |
|---|---|---|---|---|
| 2001/0053138 | A1 | 12/2001 | Pillai et al. | |
| 2002/0191562 | A1* | 12/2002 | Kumaki et al. | 370/331 |
| 2004/0022218 | A1* | 2/2004 | Kim et al. | 370/335 |
| 2006/0268818 | A1* | 11/2006 | Chen et al. | 370/349 |
| 2007/0002821 | A1 | 1/2007 | Carlson et al. | |
| 2007/0202908 | A1 | 8/2007 | Shaffer et al. | |
| 2008/0080408 | A1 | 4/2008 | Gao | |
| 2008/0153461 | A1* | 6/2008 | Chan et al. | 455/412.1 |
| 2008/0160988 | A1* | 7/2008 | Jami et al. | 455/423 |
| 2008/0225769 | A1 | 9/2008 | Noisette et al. | |
| 2009/0077620 | A1 | 3/2009 | Ravi et al. | |
| 2009/0119762 | A1 | 5/2009 | Thomson et al. | |
| 2010/0142471 | A1* | 6/2010 | Cheng et al. | 370/329 |
| 2011/0106902 | A1* | 5/2011 | Jagoe et al. | 709/206 |

FOREIGN PATENT DOCUMENTS

WO 2005117361 A1 12/2005

OTHER PUBLICATIONS

PCT International Search Report Dated Mar. 30, 2011.
Flammini, et al. "Layouts for Mobility Management in Wireless ATM Networks", Discrete Applied Mathematics, Elsevier Scientce, Amsterdam, NL. vol. 157, No. 1, Jan. 6, 2009; pp. 98-111, XP025684716; ISSN:0166-218X, DOI: DOI:10.1016/J.DAM.2008.4.025.
Bertino et al "Location-Aware Authentication and Access Control-Concepts and Issues"—2009 International Conference on Advancd Information Networking and Applications—IEEE Computer Society—pp. 10-15.
Decker, Michael "Requirements for a Location-Based Access Control Model"—Proceedings of MoMM2008—BWCCA, Nov. 2008, Linz, Austria—4 pages.

* cited by examiner

Primary Examiner — Kamran Afshar
Assistant Examiner — Khawar Iqbal
(74) Attorney, Agent, or Firm — Steven A. May; Barbara R. Doutre (57) ABSTRACT A method and apparatus for extending a virtual channel of a communication area to a user equipment is disclosed. A message including a virtual channel identity and an area identity from the user equipment is received at a call controller. The call controller determines that the virtual channel identity is associated with a communication area and the area identity is associated with an area outside the communication area. The call controller then determines whether a virtual channel extension feature is enabled on the user equipment, and if so, receives data from the user equipment and then distributes the data on the virtual channel.

13 Claims, 6 Drawing Sheets

FIG. 6

METHOD AND APPARATUS FOR EXTENDING A BROADCAST GROUP SERVICE

FIELD OF THE DISCLOSURE

The present disclosure relates generally to extending a broadcast group service in a wireless communication system. Specifically, the disclosure relates to a method and apparatus for extending a virtual channel of a communication area to a user equipment in the wireless communication system.

BACKGROUND

Third (3$^{rd}$) Generation Partnership Project (3GPP) Multimedia Broadcast Multicast Service (MBMS) on Long Term Evolution (LTE) release 9 defines a unidirectional broadcast delivery service. The focus of the standard is to allow a fixed or a wired content source provider to deliver a data stream or content on a unidirectional broadcast service (MBMS broadcast) to a particular coverage area for consumption by user equipment (UE). This allows, for example, the delivery of broadcast video sessions such as sports, news, or weather alerts in a particular area. However, one of the problems with the MBMS on LTE is that the operation is limited since it does not consider the case of a mobile content source i.e., when the content source for the MBMS broadcast service is the mobile user equipment. The content source could be, for example, a police radio that is keyed for Push to talk (PTT) service.

Further, in a group communication, there is a need for members of a group to be able to communicate regardless of location of the members of the group. In land mobile radio (LMR) conventional systems, a user's ability to communicate with other users (on the same RF channel) is based on the channel's coverage area. However, in case the user moves out of the channel's coverage area, the user fails to communicate with the other users in the group. In other words, the users that move outside the channel's coverage area can neither receive downlink broadcast data nor source data uplink for downlink broadcast on that channel.

In order to provide similar LMR conventional operation on a broadband network, MBMS on LTE can be used. Content sourced from a UE, for example a police radio that is keyed for Push to talk (PTT) service, is delivered uplink using point-to-point unicast and then distributed downlink using MBMS broadcast that is constrained to a specific coverage area within a portion of the overall broadband network's system coverage. However there are scenarios in which users desire to participate in a group service while outside the specific coverage area for the group service.

Accordingly, there is a need for a method and apparatus for extending a broadcast group service to a user equipment.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Various embodiments of the invention disclose a method of extending a virtual channel of a communication area to a user equipment (UE). The method includes receiving a message, by a call controller, from the user equipment including a virtual channel identity and an area identity. The method further includes determining that the virtual channel identity is associated with a communication area and the area identity is associated with an area outside the communication area. Further, the method determines whether a virtual channel extension feature is enabled on the UE. Upon determining that the virtual channel extension is enabled, if the UE is transmitting, data from the transmitting UE is received at the call controller and then distributed downlink on the virtual channel. If the UE is receiving, a unicast service link is established between the call controller and the UE and received data on the virtual channel is sent to the receiving UE.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, and components mentioned in the description.

Figure 1:
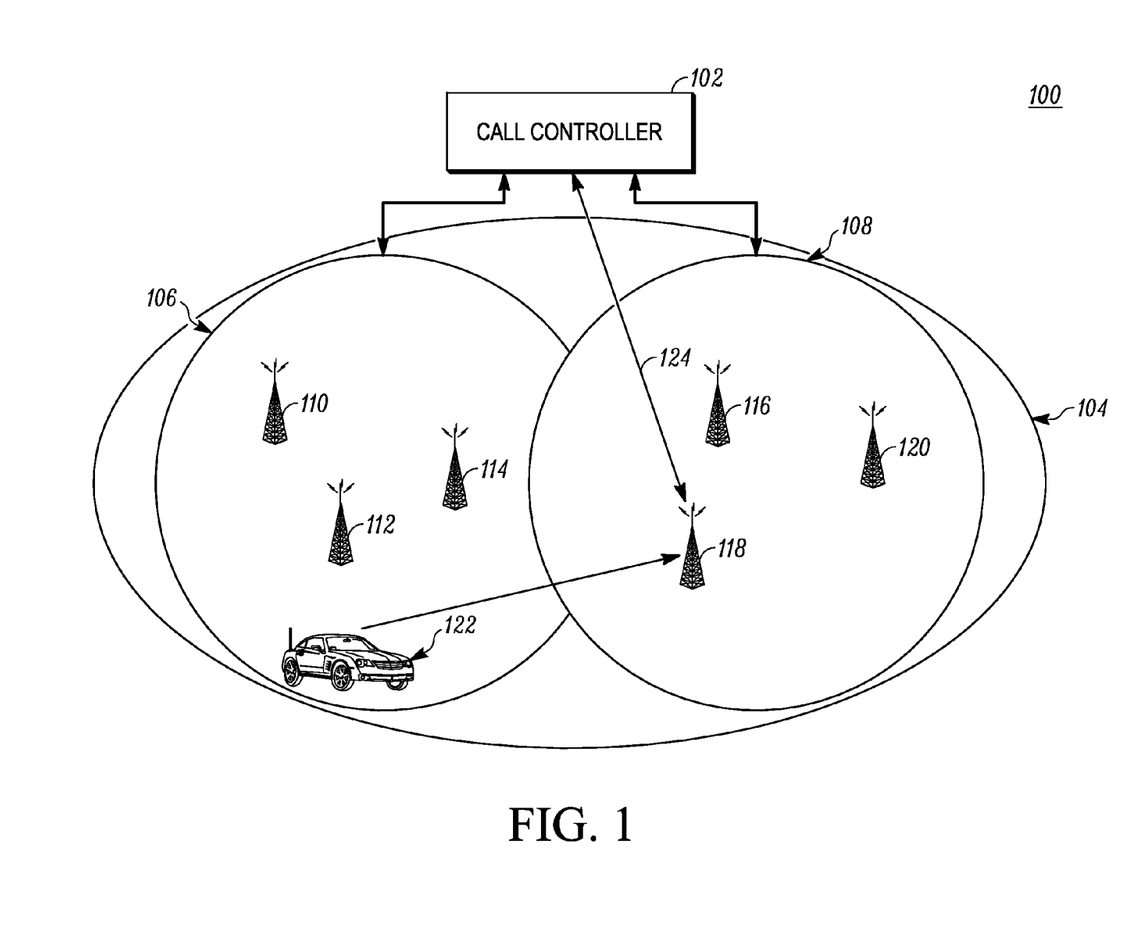
FIG. 1 is a schematic diagram of a wireless communication system in accordance with some embodiments.

FIG. 1 illustrates a schematic of a wireless communication system 100 in accordance with some embodiments. The wireless communication system 100 includes a call controller 102, one or more communication areas 104, 106, 108, and one or more base stations 110, 112, 114, 116, 118, 120. The coverage area of each of the communication areas 104-108 is made up of a plurality of base station cells (not shown) served by the base stations 110-120. In accordance with the embodiment, the base stations 110-120 in the wireless communication system 100 may be Long term Evolution (LTE) base stations providing connectivity to the wireless communication system 100. In accordance with the embodiment, the LTE base station may be referred as eNodeB (sometimes abbreviated as eNB). Further, coverage area of each base station 110-120 can be segmented into multiple cells served by directional antennas in the base stations 110-120. For example, the coverage area of each base station 110-120 is typically divided into three individual cells (not shown) and each area is referred to as a base station cell.

Also, it should be noted that the different base station cells of a particular base station can be a part of same or different communication areas. In accordance with an embodiment, different base station cells of a particular base station are in a same communication area. In accordance with another embodiment, different base stations cells of the particular base station are in different communication areas. For example, one of the base station cells of a particular base station is a part of one communication area and other two base station cells of the particular base station are part of another communication area and vice versa. In another embodiment, all three base station cells of the particular base station are a part of three different communication areas.

The base stations 110-120 are each configured to operate according to any of a number of different communication technologies including, but not limited to, 2G, 3G and 4G wireless communication technologies. These include Global System for Mobile Communication (GSM), Code Division for Multiple Access (CDMA), Universal Mobile Telecommunication System (UMTS), Wideband Code Division for Multiple Access (W-CDMA), Orthogonal Frequency Division Multiplexing (OFDM), Worldwide Interoperability for Microwave Access (WiMax), Long-Term Evolution (LTE) and other communication technologies.

A user equipment 122 (UE) in one of the communication areas 106, is served by one of the base stations 110, 112, 114. More specifically, the UE 122 is located in at least one of a base station cell of the base station. The base station cell refers to one of the cells of the base station 110-120. The UE 122 is any device used by an end user to communicate on the wireless communication system 100. Examples of UE include portable radio, cell-phone, PDA, cognitive radio and the like. In an embodiment, the UE 122 represents a mobile content source. Normally, a broadcast content source is a fixed server providing content to interested subscribers. For example, the content could be a movie, a sports clip, a news feed, weather alerts, etc. The Content Source is a head-end of a media distribution center that sources content. In accordance with the embodiment of FIG. 1, the UE 122 represents the mobile content source which, as discussed previously, includes portable radio, cell-phone, PDA, cognitive radio, and the like.

Although, three potential communication areas 104, 106, and 108 are shown, any number (one or higher) of potential communication areas can be accommodated. In accordance with the embodiment, each communication area 104-108 in the wireless communication system 100 corresponds to a geographical area in which group communication for a particular virtual channel is supported. Further, uplink group communication is unicast from the UE 122 to the call controller 102 and then downlink the group communication is broadcast within the communication area from the call controller 102. For illustrative purposes, each communication area 104-108 is shown in a circular shape, although the actual shape of the communication area 104-108 will vary based on various factors, such as, coverage area of the base stations 110-120 serving each of the communication area 104-108, interference, terrain, modulation type, radio frequency (RF) band, or the like. Further, each communication area 104-108 supports one or more virtual channels. A virtual channel is a logical data channel supporting group communication within communication area 104-108 that supports a single point-to-multipoint broadcast data path. For illustrative purposes, the communication area 104 supports a set of virtual channels, for example, C1-C18. Further, the communication area 106 supports virtual channel, for example, B1 and the communication area 108 supports virtual channel, for example, P1, where virtual channel P1 is different from B1 and C1-C18 and vice versa.

Further, the call controller 102 is communicatively coupled to the base stations 110-120. In accordance with the embodiments of the invention, the call controller 102 enables the UE 122 operating on a particular virtual channel within a communication area to roam out of the communication area and yet maintain its connectivity with the virtual channel. For example, if a UE 122 which is actively transmitting on virtual channel B1 within communication area 106 moves geographically out of the communication area 106 to an area that does not support the virtual channel B1, for example, communication area 108, the call controller 102 enables the UE 122 to maintain uplink and downlink connectivity with the virtual channel B1. The operation of the call controller 102 for a transmitting UE 122 and a receiving UE 122 will be explained below.

Transmit Mode:

From FIG. 1, the UE 122 is currently transmitting on virtual channel B1 in a communication area 106. The UE 122 then moves out of the communication area 106, the UE 122 performs handover from a base station 112 in the communication area 106 to a base station 118 in an area outside the communication area 106, for example, the communication area 108. It should be noted that the area outside the communication area 106 can either be any other communication area that does not support the virtual channel B1, for example communication area 108, or any other area that is not defined by a specific boundary and also does not support virtual channel B1. The UE 122 then determines an area identity associated with the area, for example, the area identity associated with the communication area 108. The area identity may be a base station cell identity, an eNB cell identity, communication area identity, a base station identity, geo coordinates or other identification that conveys the current location of the UE 122. Further, the base station cell identity identifies a base station cell associated with the base station 118 to which the UE 122 has been handed off. Also, the communication area identity identifies Multicast Broadcast Single Frequency Network (MBSFN) associated with the base station 118 to which the UE 122 has been handed off.

Further, the UE 122 identifies a virtual channel identity identifying a virtual channel B1 on which the UE 122 was transmitting in the communication area 106, prior to performing handover to the base station 118 in the communication area 108, in this example. Then, the UE 122 transmits the area identity and the virtual channel identity embedded in a message 124 to the call controller 102. In accordance with an embodiment, the UE 122 transmits the area identity and the virtual channel identity embedded in data transmitted from the UE 122 to the call controller 102.

Further, the call controller 102 upon receiving the message 124 having the virtual channel identity and the area identity, determines, using the virtual channel identity, the communication area 106 where the virtual channel B1 is supported. Then, the call controller 102 also determines that the base station cell identified by the area identify is not associated with the communication area 106. Upon determining that the virtual channel identity is associated with the communication area 106 and the area identity is not associated with the communication area 106, the call controller 102 verifies whether a virtual channel extension feature is enabled on the UE 122. The virtual channel extension feature allows the UE 122 to continue communicating on a virtual channel supported by a particular communication area even if the UE 122 is no longer within that particular communication area. The virtual channel extension feature can be enabled by a user of the UE 122 based on the user preferences.

Further, if the virtual channel extension feature is enabled on the UE 122, the call controller 102 receives data from the UE 122 and distributes the received data downlink on the virtual channel B1. Therefore, although the UE 122 (being the mobile content source), moves out of the communication area 106, the call controller 102 enables the UE 122 to continue transmitting on the virtual channel B1 supported by the communication area 106. Thus, the call controller 102 extends the virtual channel B1 to the UE 122 which is currently transmitting outside the communication area 106.

On the other hand, if the call controller 102 determines that the virtual channel extension feature is not enabled on the UE 122, the call controller 102 sends a rejection notification to the UE 122 and does not distribute the received data downlink on the virtual channel B1.

Receive Mode:

In another exemplary embodiment, the UE 122 is actively receiving data on virtual channel B1 (for example a downlink MBMS broadcast on LTE) within the communication area 106 and UE 122 moves to an area outside the communication area 106 that does not support virtual channel B1. It should be noted that the area outside the communication area 106 can either be a communication area 108, or any other area that is not defined by a specific boundary. In this case, after the call controller 102 determines that the virtual channel extension feature is enabled on the UE 122 in a manner similar to when the UE 122 is actively transmitting, the call controller 102 establishes a unicast service link between the call controller 102 and the UE 122. The downlink unicast service link may be referred to as a point-to-point link that connects the call controller 102 and the UE 122 for communication. The call controller 102 then receives data for the virtual channel B1 on which the UE 122 was receiving data while in the communication area 106 and distributes the received data to the UE 122 on the established unicast service link. Thus, the UE 122 continues to receive virtual channel B1 data even after the UE 122 moves out of the communication area 106.

Therefore, as discussed for the two modes above, the UE 122 continues to transmit data in transmit mode and receive data in receive mode on the virtual channel B1 even if the UE 122 moves out of the communication area 106 supporting the virtual channel B1. In yet another embodiment, when the UE 122 is in idle mode (i.e, no activity) the call controller 102 performs the functions/steps similar to as described for the UE 122 while in a receive mode.

Figure 2:
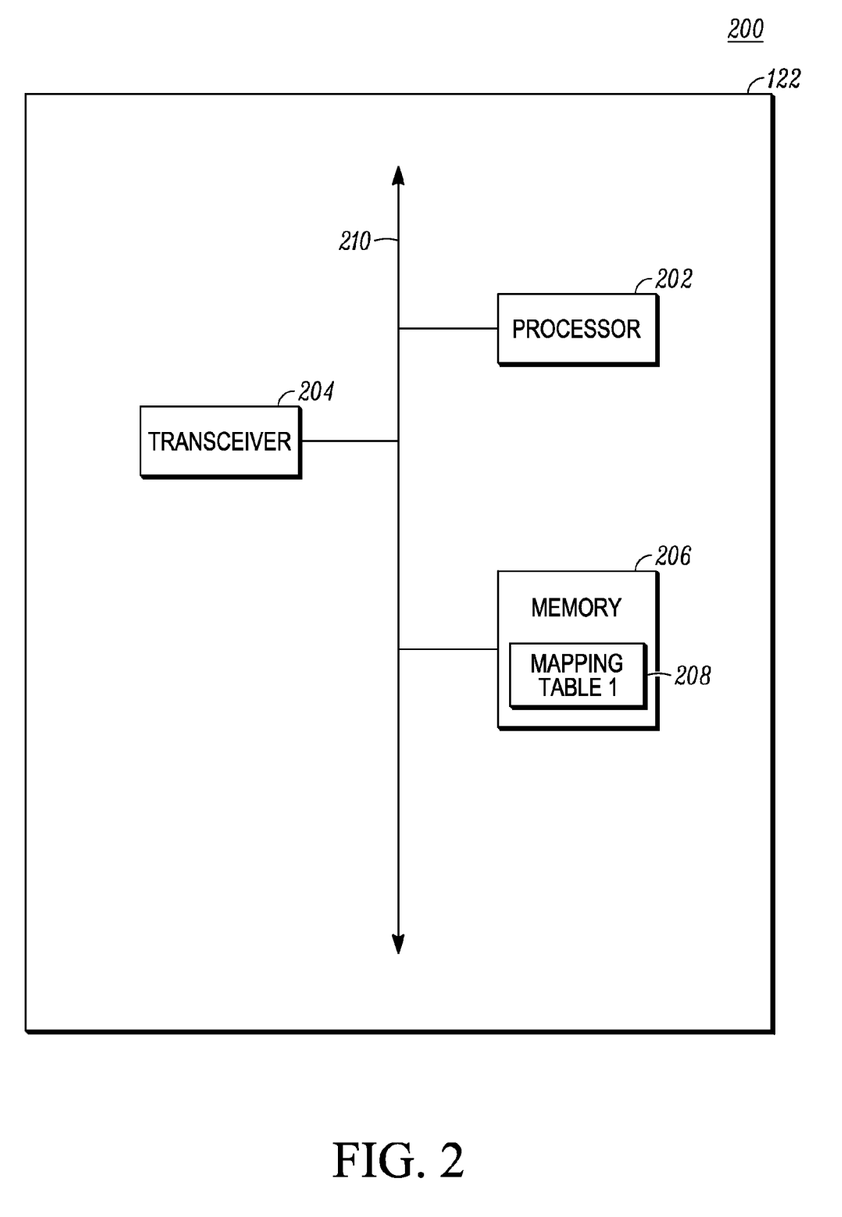
FIG. 2 is a block diagram of a user equipment in accordance with some embodiments.

FIG. 2 is a block diagram of a user equipment (UE) 122 in accordance with some embodiments. The UE 122 includes a processor 202, a transceiver 204, a memory 206 each capable of communicating with one or more components of the UE 122. For example, as shown in FIG. 2, all components are coupled to a bidirectional system bus 210. The UE 122 represents a mobile content source which as mentioned previously may comprise portable radio, cell-phone, PDA, cognitive radio and the like.

The processor 202 (such as a microprocessor or the like) typically controls the general operation of the UE 122. The transceiver unit 204 can be implemented as a transmitting and receiving component of the UE 122. In an embodiment, the functions of the transceiver 204 can be implemented in the processor 202. For example, in accordance with the embodiment, the transceiver 204 transmits a virtual channel extension request message created by the processor 202 over an antenna (not shown). Further, the processor is configured to create the virtual channel extension request. The virtual channel extension request message includes a virtual channel identity and an area identity associated with the UE 122. The antenna includes any known or developed structure for radiating and receiving electromagnetic energy in the frequency range containing the wireless carrier frequencies.

The memory 206 may store software programs or the like used for the processing and controlling operations performed by the processor 202, or may temporarily store data e.g., a Mapping Table-1 208. The Mapping Table-1 208 stores a map or list of one or more area identities and a corresponding one or more supported virtual channels. The memory 206 might also store information that identifies if a virtual channel extension feature is enabled or not for the UE 122.

It should be noted that the memory 206 containing the Memory Table-1 208 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like.

In accordance with the embodiment, the Mapping Table-1 208 shows a mapping of one or more area identities and the corresponding one or more supported virtual channels.

In an example, Mapping Table 1.1 associates a list of base station cells, for example, associated cells with the base stations 110-120 corresponding to the respective supported virtual channels. Mapping Table-1.2 includes a list of communication areas 104-108 corresponding to the virtual channels supported by each of the communication areas 104-108. Thus, the Mapping Table-1 208 stores the information which the UE 122 uses to determine the virtual channel on which the UE 122 can transmit or receive in a coverage area of a particular base station cell or in a particular communication area. Further, the UE 122 looks up the virtual channel identity and the area identity from the Mapping Table 1.1 and the Mapping Table 1.2. An example of Mapping Table-1 208 is as shown below:

MAPPING TABLE 1.1

| Area Identity (Base station Cell Identity) | Virtual Channels |
|---|---|
| Cell 1 | B1, C1-C18 |
| Cell 2 | B1, C1-C18 |
| Cell 3 | B1, C1-C18 |
| Cell 4 | B5, C1-C18, P20, P21 |
| Cell 5 | B5, C1-C18, P20, P21 |
| . | . |
| . | . |
| . | . |

MAPPING TABLE 1.2

| Area Identity (Communication Area) | Virtual Channels |
|---|---|
| CA-104 | C1-C18 |
| CA-106 | B1 |

MAPPING TABLE 1.2-continued

| Area Identity (Communication Area) | Virtual Channels |
|---|---|
| CA-108 | P1 |
| . | . |
| . | . |
| . | . |

Figure 3:
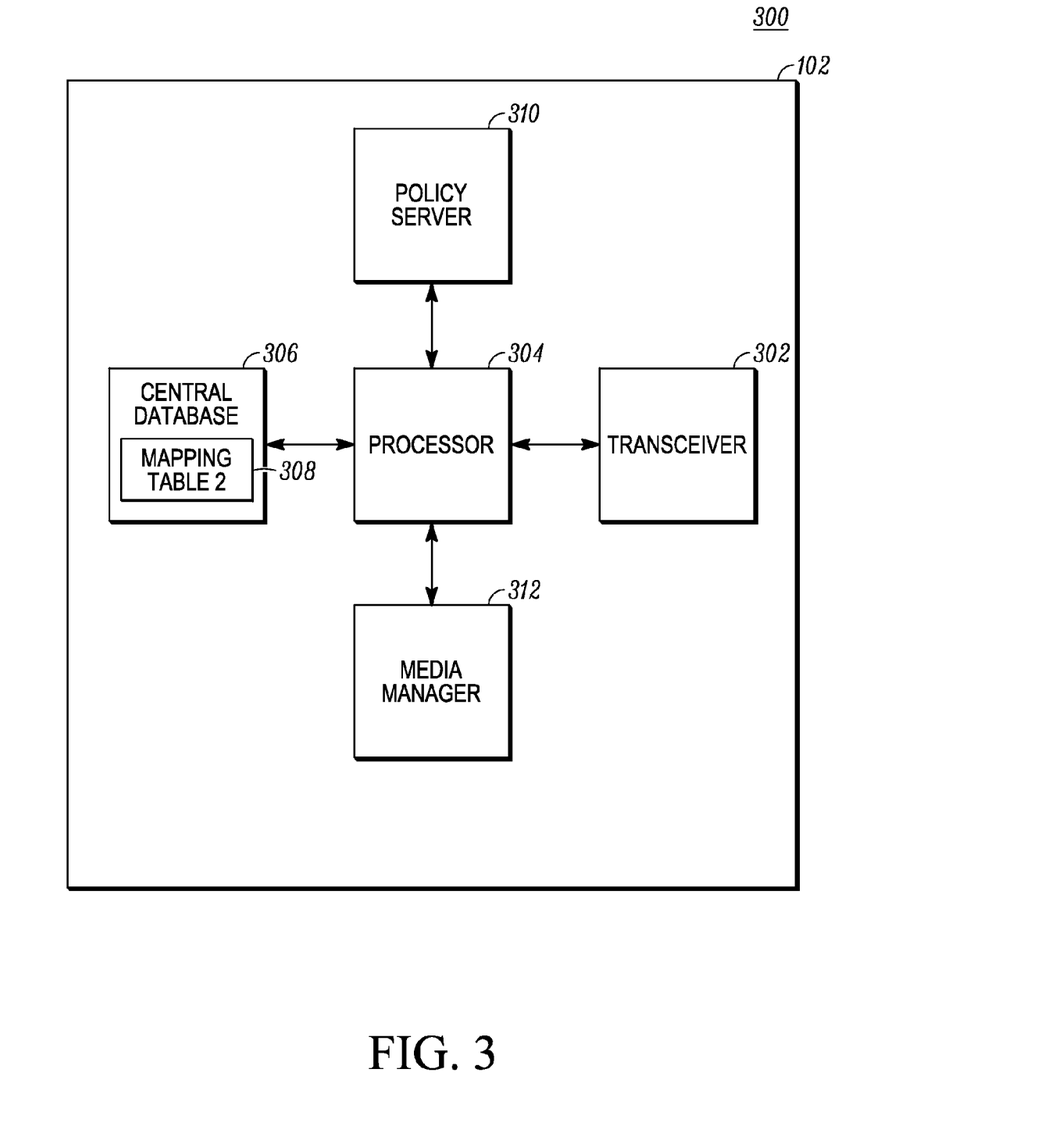
FIG. 3 is a block diagram a call controller in accordance with some embodiments.

FIG. 3 is a block diagram 300 of a call controller 102 in accordance with some embodiments of the invention. Referring to FIG. 3, the call controller 102 includes a transceiver 302, a processor 304, a central database 306, a policy server 310, and a media manager 312.

The transceiver unit 302 can be implemented as a transmitting and receiving component of the call controller 102. The transceiver unit 302 makes content available to the call controller 102. For example, in accordance with the embodiment, the transceiver 302 receives data intended for the processor 304 via a network connection.

The processor 304 (such as a microprocessor or the like) typically controls the general operation of the call controller 102. For example, the processor 304 receives a virtual channel identity and an area identity from the UE 122 and determines that the virtual channel identity is associated with the communication area 106 and the area identity is associated with an area outside the communication area 106. In accordance with an embodiment, the processor 304 determines whether a virtual channel extension feature is enabled on the UE 122 or not based on the information stored in a policy server 310. The policy server 310 stores the information related to the virtual channel extension feature of the UE 122. Further, the virtual channel extension can be enabled by a user of the UE 122. In one embodiment, the policy server 310 stores the information which indicates whether the UE 122 is authorized for both transmit and receive or receive only or transmit only for virtual channel extension in the particular communication area 104-108.

The central database 306 stores a Mapping Table-2 308. The Mapping Table-2 308 contains the list of one or more communication areas 104-108, the virtual channels supported by the respective communication areas 104-108, and one or more base stations cells or eNB cells assigned to each of the communication areas 104-108. The base station cells or the eNB cell refers to the cells associated with the base stations 110-120.

The Mapping Table-2 308 lists the virtual channels supported by the communication areas 104-108 and the base station cells assigned to each of the communication areas 104-108. Based on the Mapping Table-2 308, the processor 304 in the call controller 102 determines that the virtual channel identity is associated with the communication area and the area identity is associated with an area outside the communication area. An example of Mapping Table-2 308 is as shown below:

MAPPING TABLE 2

| Communication Area | Virtual Channel | Base Station Cell Identity |
|---|---|---|
| CA-104 | C1-C18 | Cell 1, 2, 3, 4 . . . X |
| CA-106 | B1 | Cell 1, 2, 3, 4 |
| CA-108 | P1 | Cell 5, 6, 7 |
| CA-x | channels | Cells |

Further, the call controller 102 also contains a media manager 312 that converts the uplink data received from the UE 122 to downlink data so that the data can be distributed on the virtual channel B1 within the communication area 106. In another embodiment, the data is also distributed external to the communication area 106 to the UEs that have been granted virtual channel extension request and were communicating on the virtual channel B1.

Operationally, the transceiver 302 receives the virtual channel extension request message containing the virtual channel identity and the area identity from the UE 122. The processor 304 determines that the virtual channel identity is associated with the communication area 106 and the area identity is not associated with the communication area 106. The processor 304 then verifies from the policy server 310 if the virtual channel extension feature is enabled on the UE 122. If the virtual channel extension feature is enabled on the UE 122, the transceiver 302 receives uplink data from the UE 122 (in transmit mode). It should be noted that the data can be received either from the UE 122 within the communication area 108 that is served by base station 118 to which the UE 122 has been handed off or from a UE in any area not specified by a boundary and the UE being granted virtual channel extension request. Furthermore, the media manager 312 converts the received uplink data to downlink data and the transceiver 302 transmits the downlink data on the virtual channel.

Figure 4:
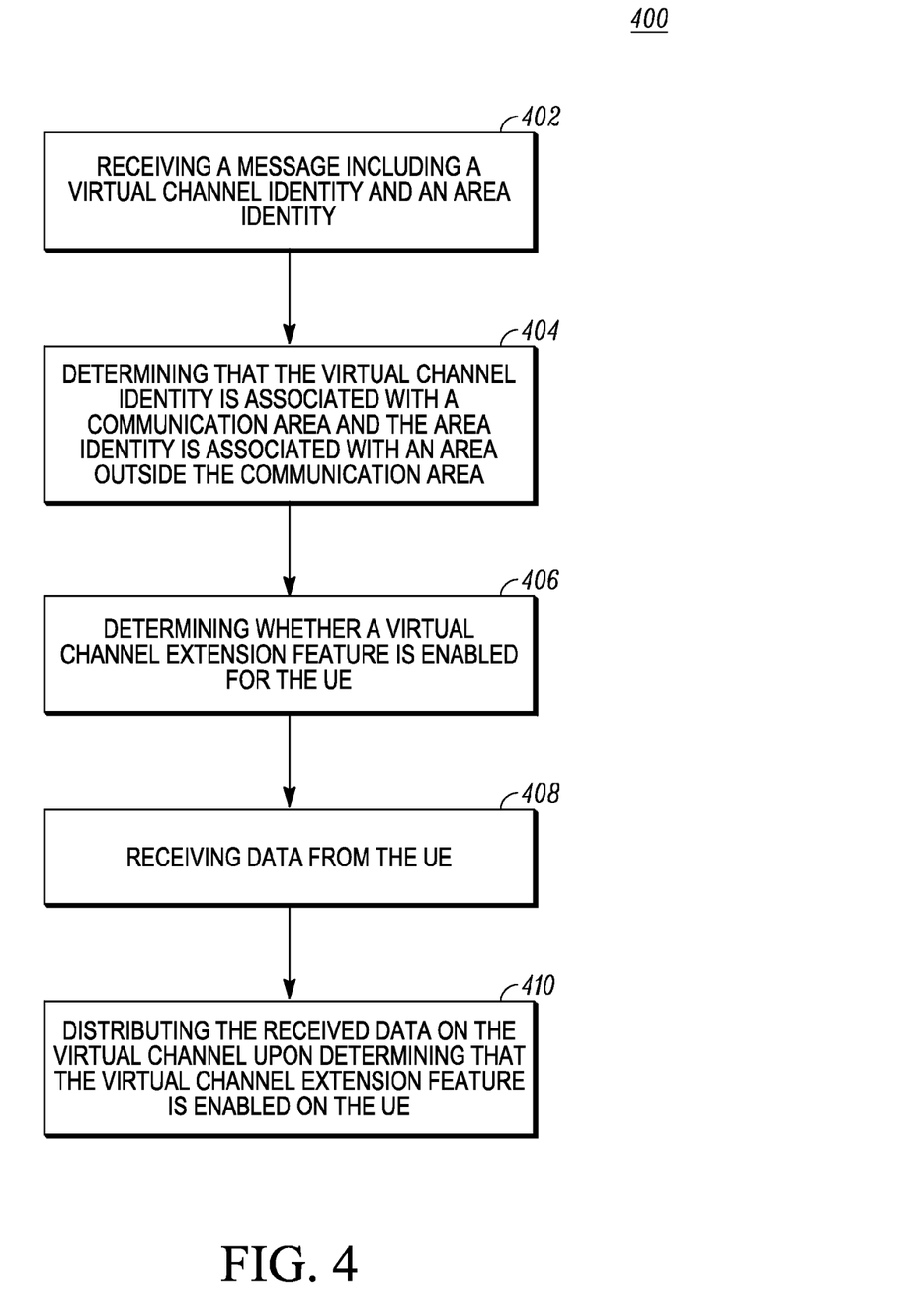
FIG. 4 is a flowchart depicting a method for extending a virtual channel of a communication area to a user equipment (UE) by a call controller, while the UE is in a transmit mode.

FIG. 4 is a flowchart of a method 400 for extending a virtual channel of a communication area 106 to a user equipment (UE) 122 by a call controller 102 while the UE 122 is in a transmit mode. The transmit mode refers to a mode of communication when the UE 122 is transmitting data. For example, while in the transmit mode, the UE 122 is actively transmitting on a virtual channel B1 in a communication area 106. The UE 122 then moves out of communication area 106 and performs handover from a base station 112 in the serving communication area to a base station 118 in communication area 108 that does not support the virtual channels B1 supported by the communication area 106. Normally in a conventional LMR system, after leaving a communication area, the UE 122 will not be able to continue communicating with its communication group. However, in accordance with the embodiments of the invention, the call controller 102 enables the UE 122 to continue transmitting in the communication area 108. Further, the UE 122 determines the area identity using the Mapping Table-1 and identifies a virtual identity used by the UE 122. Further, the UE 122 transmits a virtual channel extension request message having the virtual channel identity and the area identity to the call controller 102. The area identity may be a base station cell identity, an eNB cell identity, communication area identity, a base station identity, geo co-ordinates or other identification that conveys the current location of the UE 122. Further, the base station cell identity or the eNB cell identity identifies a base station cell or a eNB cell associated with the base station 118 to which the UE 122 has been handed off. Specifically, the area identity identifies a base station cell associated with the base station serving the communication area to which the UE 122 has been handed off. As discussed previously, typically the coverage area of each base station 110-120 is divided into three individual cells, where each cell is referred to as a base station cell. For example, the base station cell refers to at least one of the cells of the base station 118 that is serving the UE 122 in the communication area 108. In another embodiment, the area identity identifies the communication area 108 served by the base station 118 to which the UE 122 has been handed off.

Referring to FIG. 4, the method 400 begins with a step of receiving 402 a message, by the call controller 102, including the virtual channel identity and the area identity. The virtual channel identity identifies a virtual channel being utilized by the UE 122 while the UE 122 is in the communication area 106. Further, the area identity identifies at least one base station cell of the base station 118 serving the area, e.g., communication area 108 to which the UE 122 has been handed off. In another embodiment, the area identity identifies the communication area 108.

In accordance with the embodiment, the received virtual channel identity and the area identity are embedded in a floor control message, standalone request message, a session control message, or in data transmitted from the UE 122 to the call controller 102.

The call controller 102 then determines 404 that the virtual channel identity is associated with the communication area 106 and the area identity is associated with the area, for example, communication area 108 that does not support the virtual channel B1. Further, the call controller 102 determines 406 whether a virtual channel extension is enabled on the UE 122. The virtual channel extension feature enables the UE 122 to continue communicating on a particular virtual channel even if the UE moves out of a coverage area of a particular communication area that supports that particular virtual channel to an area that does not support that particular virtual channel. The virtual channel extension feature can be enabled or disabled by a user of the UE 122.

In an embodiment, determining 406 that the virtual channel extension feature is enabled on the UE 122 comprises determining that the virtual channel extension feature is enabled in the UE 122 for a particular communication area. For example, the virtual channel extension feature can be enabled for the communication area 108, while not being enabled for the communication area 104. This is based on the user preferences and such user preferences can be stored in the memory 206 of the UE 122 or in the policy server 310 of the call controller 102. In accordance with another embodiment, the virtual channel extension feature can be enabled by an operator.

After determining 406 that the virtual channel extension feature is enabled on the UE 122 in the area outside the communication area 106, the call controller 102 receives 408 data from the UE 122. After receiving 408 the data from the UE 122, the call controller 102 distributes 410 the received data downlink on the virtual channel B1 to one or more UEs receiving on the virtual channel B1. More particularly, the data is distributed to one or more UEs receiving on the virtual channel B1 within the communication area 106 and to one or more UEs that were receiving on virtual channel B1 and were granted virtual channel extension.

On the other hand, if the call controller 102 determines that the virtual channel extension feature is not enabled on the UE 122 in the area outside the communication area 106, the call controller 102 transmits a rejection notification to the UE 122. The rejection notification indicates that the UE 122 cannot continue communication, for example, the UE 122 cannot transmit data on the virtual channel after the UE 122 moves outside the communication area 106.

Thus, as discussed above, the UE 122 continues to transmit data on the virtual channel, for example, virtual channel B1 even if the UE 122 moves out of the communication area 106 as enabled by the call controller 102.

Figure 5:
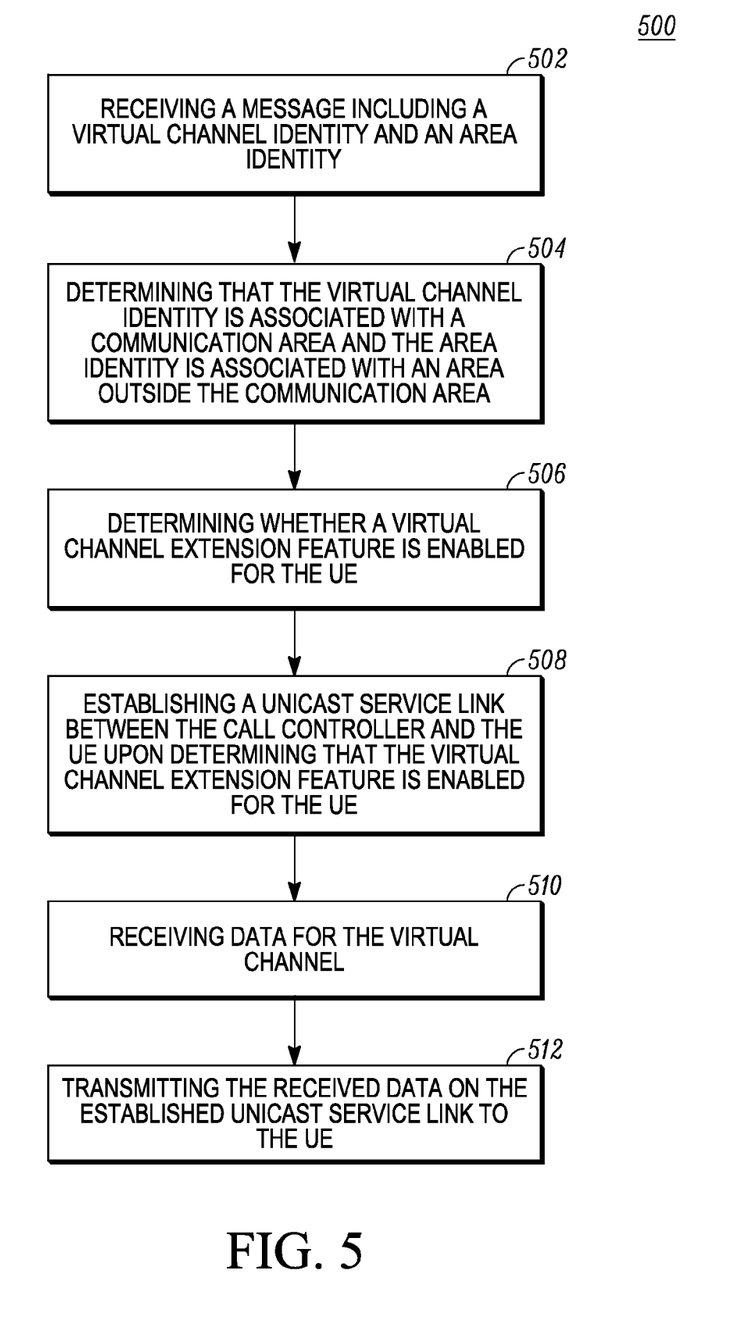
FIG. 5 is a flowchart depicting a method for extending a virtual channel of a communication area to a user equipment (UE) by a call controller, while the UE is in a receive mode.

FIG. 5 is a flowchart of a method 500 for extending a virtual channel of a communication area 106 to a user equipment (UE) 122 by a call controller 102, while the UE 122 is in a receive mode. The receive mode refers to a mode of communication while the UE is receiving data. For example, while in the receive mode, the UE 122 is actively receiving on a virtual channel, e.g., virtual channel B1 in a communication area 106. The UE 122 then performs handover from a base station 112 in the communication area 106 to a base station in another communication area, for example, communication area 108 that does not support the virtual channel B1 supported by the communication area 106. Normally in a conventional LMR system, after leaving a communication area, the UE 122 will not be able to continue communicating with its communication group. However, in accordance with the embodiments of the invention, the call controller 102 enables the UE 122 to continue receiving data after the UE 122 is handed off from the base station 112 in the communication area 106. Further, the UE 122 determines an area identity using the Mapping Table-1 and identifies the virtual channel identity associated with the UE 122. Further, the UE 122 transmits a message having the virtual channel identity and the area identity to the call controller 102. The message may be referred to as virtual channel extension request message. The area identity may be a base station cell identity, an eNB cell identity, communication area identity, a base station identity, geo co-ordinates or other identification that conveys the current location of the UE 122. Further, the base station cell identity identifies a base station cell associated with the base station 118 to which the UE 122 has been handed off. As discussed previously, typically the coverage area of each base station 110-120 is divided into three individual cells, where each cell is referred to as a base station cell. For example, the base station cell refers to at least one of the cells of the base station 118 that is serving the UE 122 in the target communication area 108. In another embodiment, the area identity identifies the target communication area 108 that is served by the base station 118 to which the UE 122 has been handed off.

Referring to FIG. 5, the method 500 begins with a step of receiving 502 a message, by the call controller 102, including a virtual channel identity and an area identity. The virtual channel identity identifies a virtual channel being utilized by the UE 122 while the UE 122 is in the communication area 106. Further, the area identity identifies at least one base station cell of the base station 118 serving the area, e.g., communication area 108 to which the UE 122 has been handed off from the base station 112 serving the communication area 106.

In accordance with the embodiment, the received virtual channel identity and the area identity are embedded in a floor control message, standalone request message, a session control message.

The call controller 102 then determines 504 that the virtual channel identity is associated with the communication area 106 and the area identity is associated with the area, for example, communication area 108 that does not support the virtual channel B1. Further, the call controller 102 determines 506 whether a virtual channel extension feature is enabled on the UE 122. The virtual channel feature enables the UE 122 to continue communicating on a particular virtual channel even if the UE moves out of a coverage area of a particular communication area that supports that particular virtual channel to an area that does not support that particular virtual channel. The virtual channel extension feature can be enabled or disabled by a user of the UE 122.

In an embodiment, determining 506 that the virtual channel extension feature is enabled on the UE 122 further comprises determining that the virtual channel extension feature is enabled in the UE 122 for a particular area. For example, the virtual channel extension feature can be enabled for the communication area 108, while not being enabled for the communication area 104. This is based on the user preferences and such user preferences can be stored in the memory 206 of the UE 122 or the policy server 310 of the call controller 102.

On determining 506 that a virtual channel extension feature is enabled on the UE 122 in the area outside the communication area 106, the call controller 102 establishes a unicast service link between the call controller 102 and the UE 122. In accordance with the embodiment, the unicast service link is established by the UE 122. Further, the unicast service link can be a point-to-point link. Then, the call controller 102 receives 510 data from the virtual channel B1 supported by the communication area 106 and then transmits 512 the received data on the established unicast service link to the UE 122.

In accordance with an embodiment, the call controller 102 transmits the received data to the UEs that were granted virtual channel extension request and were initially receiving on virtual channel B1.

Figure 6:
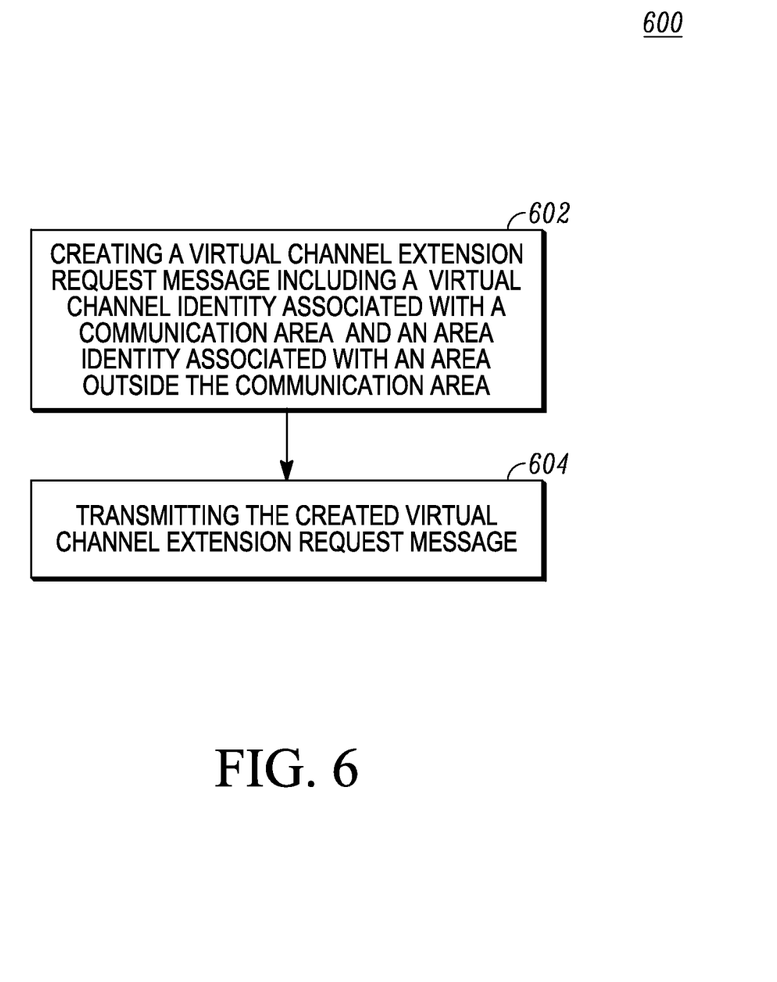
FIG. 6 is a flowchart depicting a method for extending a virtual channel of a communication area to a user equipment (UE).

FIG. 6 is a flowchart of a method of extending a virtual channel of a communication area to a user equipment (UE). Referring to FIG. 6, the method 600 begins by creating 602 a virtual channel extension request message by the UE 122. In accordance with the embodiment, the virtual channel extension request message is created for particular virtual channel when the UE 122 moves outside the communication area 106. In accordance with another embodiment, the virtual channel extension request message is created for a particular virtual channel while within the communication area 106 supporting the virtual channel B1. For example, this may be necessary for poor broadcast reception, higher reliability, user policy, etc.

Further, the virtual channel extension request message is created in response to the UE being powered on or the user selecting a different virtual channel. The base station 110-120 contains a Mapping Table which can be used to create the virtual channel extension request message. The virtual channel extension request message includes a virtual channel identity associated with a communication area 106 and an area identity associated with an area outside the communication area 106, e.g., communication area 108. In accordance with the embodiment, virtual channel identity identifies the virtual channel, e.g., virtual channel B1 supported by the communication area 106. Further, the area identity may be a base station cell identity, an eNB cell identity, communication area identity, a base station identity, geo co-ordinates or other identification that conveys the current location of the UE 122. Also, the base station cell identity identifies a base station cell associated with the base station 118 to which the UE 122 has been handed off. As discussed previously, typically the coverage area of each base station 110-120 is divided into three individual cells, where each cell is referred to as a base station cell. For example, the base station cell refers to at least one of the cells of the base station 118 that is serving the UE 122 in the communication area 108. In another embodiment, the area identity identifies the communication area 108 to which the UE 122 has been handed off.

Further, it should also be noted that the area outside the communication area 106 may include an area without any specific boundary. The UE 122 then transmits 604 the created virtual channel extension request message to the call controller 102. Based on the received virtual channel extension request message, the call controller 102 proceeds to extending the virtual channel B1 supported by the communication area 106 to the UE 122 when the UE 122 moves out of the communication area 106, as discussed previously.

Accordingly, there has been provided a method and apparatus for extending a broadcast group service to user equipment. User's can now move out of a channel coverage area and communicate with other users on the virtual channel by utilizing Virtual Channel Extension. This allows transmitting, receiving, or idle user equipment that has moved outside the range of the virtual channel's communication area to request a virtual channel extension enabling continued communication on the virtual channel. As related to public safety, this has the advantage of extending public safety communication among required public safety responders even when said responders are not all within the same communication area. The Virtual Channel Extension provides the further advantage of allowing user equipment experiencing poor RF reception within a communication area to receive a higher reliable unicast link.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of extending a virtual channel of a communication area to a user equipment (UE), by a call controller, the method at the call controller comprising:
   receiving, from the UE, a message including a virtual channel identity and an area identity;
   determining that the virtual channel identity is associated with the communication area, wherein the communication area is a wireless coverage area in which the virtual channel is broadcast, and the area identity is associated with an area outside the communication area, wherein the area outside the communication area is a wireless coverage area outside of the broadcast of the virtual channel;
   determining whether a virtual channel extension feature is enabled for the UE;
   receiving data from the UE; and
   distributing the received data on the virtual channel upon determining that the virtual channel extension feature is enabled on the UE.

2. The method of claim 1, wherein receiving the message including the virtual channel identity and the area identity includes receiving the virtual channel identity and the area identity embedded in at least one of a) the received data, b) a floor control message, c) a standalone request message, and d) a session control message.

3. The method of claim 1, wherein determining that the area identity is associated with the area outside the communication area further comprises:
   determining that the UE has been handed-off to a base station in the area outside the communication area.

4. The method of claim 1, wherein determining that the virtual channel extension feature is enabled on the UE further comprises determining that the virtual channel extension feature is enabled in the area outside the communication area.

5. The method of claim 1, further comprising transmitting a rejection notification to the UE upon determining that the virtual channel extension feature is not enabled on the UE.

6. The method of claim 1, wherein the UE is transmitting on the virtual channel.

7. A method of extending a virtual channel of a communication area to a user equipment (UE), by a call controller, the method at the call controller comprising:
   receiving, from the UE, a message including a virtual channel identity and an area identity;
   determining that the virtual channel identity is associated with the communication area, wherein the communication area is a wireless coverage area in which the virtual channel is broadcast, and the area identity is associated with an area outside the communication area, wherein the area outside the communication area is a wireless coverage area outside of the broadcast of the virtual channel;
   determining whether a virtual channel extension feature is enabled for the UE;
   establishing a unicast service link between the call controller and the UE upon determining that the virtual channel extension feature is enabled on the UE;
   receiving data for the virtual channel; and
   transmitting the received data on the established unicast service link to the UE.

8. The method of claim 7, wherein the UE is receiving data on the virtual channel.

9. The method of claim 7, further comprising transmitting a rejection notification to the UE upon determining that the virtual channel extension feature is not enabled on the UE.

10. A call controller for extending a virtual channel of a communication area to user equipment (UE), the call controller comprising:
    a transceiver for receiving, from the UE, a message including a virtual channel identity and an area identity;
    a processor for determining that the virtual channel identity is associated with the communication area, wherein the communication area is a wireless coverage area in which the virtual channel is broadcast, and the area identity is associated with an area outside the communication area, wherein the area outside the communication area is a wireless coverage area outside of the broadcast of the virtual channel;
    the processor for determining whether a virtual channel extension feature is enabled on the UE, and
    the transceiver for receiving data from the UE and distributing the received data on the virtual channel upon determining that the virtual channel extension feature is enabled on the UE.

11. The call controller of claim 10, further comprises a policy server including information associated with the virtual channel extension feature of the UE.

12. The call controller of claim 10, further comprises a media manager to convert the data received from the UE to a broadcast data.

13. A call controller for extending a virtual channel of a communication area to user equipment (UE), the call controller comprising:
- a transceiver for receiving, from the UE, a message including a virtual channel identity and an area identity;
- a processor for determining that the virtual channel identity is associated with the communication area, wherein the communication area is a wireless coverage area in which the virtual channel is broadcast, and the area identity is associated with an area outside the communication area, wherein the area outside the communication area is a wireless coverage area outside of the broadcast of the virtual channel;
- the processor for determining whether a virtual channel extension feature is enabled on the UE; and
- the transceiver for establishing a unicast service link between the call controller and the UE upon determining that the virtual channel extension feature is enabled on the UE, receiving data for the virtual channel, and transmitting the received data on the established unicast service link to the UE.

\* \* \* \* \*